US009677509B2

(12) United States Patent
Teng et al.

(10) Patent No.: US 9,677,509 B2
(45) Date of Patent: Jun. 13, 2017

(54) EXHAUST POWER TURBINE DRIVEN EGR PUMP FOR DIESEL ENGINES

(71) Applicant: AVL POWERTRAIN ENGINEERING, INC., Plymouth, MI (US)

(72) Inventors: Ho Teng, Canton, MI (US); Gerhard Regner, San Diego, CA (US); Gary Hunter, Dexter, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 233 days.

(21) Appl. No.: 14/082,699

(22) Filed: Nov. 18, 2013

(65) Prior Publication Data

US 2014/0075936 A1 Mar. 20, 2014

Related U.S. Application Data

(62) Division of application No. 12/785,095, filed on May 21, 2010, now Pat. No. 8,584,458.

(Continued)

(51) Int. Cl.
*F02M 25/07* (2006.01)
*F02B 37/00* (2006.01)
(Continued)

(52) U.S. Cl.
CPC ......... *F02M 25/0704* (2013.01); *F02B 37/00* (2013.01); *F02M 26/02* (2016.02);
(Continued)

(58) Field of Classification Search
CPC .... F02B 37/001; F02B 37/004; F02B 37/007; F02B 37/013; F02B 37/025; F02B 37/18;
(Continued)

(56) References Cited

U.S. PATENT DOCUMENTS 5,791,146 A * 8/1998 Dungner ............... F02B 37/025
60/605.2
5,794,445 A * 8/1998 Dungner ............... F01N 13/107
60/605.2

(Continued)

FOREIGN PATENT DOCUMENTS

JP 2001132442 A 5/2001

OTHER PUBLICATIONS

Southwest Research Institute, "Low Emissions Potential of EGR-SCR-DDF and Advanced Fuel Formulations—A Progress Report," Oct. 2002.

*Primary Examiner* — Mark Laurenzi
*Assistant Examiner* — Brandon Lee
(74) *Attorney, Agent, or Firm* — Harness, Dickey & Pierce, P.L.C.

(57) ABSTRACT

A power plant is provided and may include an engine configured to receive charge air and produce exhaust. A first turbo machine may be driven by the exhaust and may drive a compressor that receives air and produces the charge air. A second turbo machine may receive the exhaust and may rotationally drive a pump in response thereto. The pump may receive an EGR from the exhaust and may introduce the pumped EGR to the charge air.

23 Claims, 1 Drawing Sheet

Related U.S. Application Data

(60) Provisional application No. 61/180,493, filed on May 22, 2009.

(51) Int. Cl.
*F02M 26/05* (2016.01)
*F02M 26/02* (2016.01)
*F02M 26/08* (2016.01)
*F02M 26/19* (2016.01)
*F02M 26/24* (2016.01)
*F02B 75/22* (2006.01)

(52) U.S. Cl.
CPC ............ *F02M 26/05* (2016.02); *F02M 26/08* (2016.02); *F02M 26/19* (2016.02); *F02M 26/24* (2016.02); *F02B 75/22* (2013.01); *Y02T 10/144* (2013.01)

(58) Field of Classification Search
CPC ...... F02B 37/24; F02B 37/183; F02B 37/186; F02B 29/04; F02B 29/0437; F02B 29/0456; F02B 37/00; F02B 75/22; F01N 5/04; F02M 25/0707; F02M 25/0704; F02M 26/02; F02M 26/05; F02M 26/08; F02M 26/19; F02M 26/24; Y02T 10/144

USPC .................................. 60/605.2, 612; 123/562
See application file for complete search history.

(56) References Cited

U.S. PATENT DOCUMENTS

| | | | |
|---|---|---|---|
| 6,244,256 B1* | 6/2001 | Wall | F02B 29/0425 123/568.12 |
| 6,351,946 B1* | 3/2002 | Faletti | F02B 37/005 60/605.2 |
| 7,013,879 B2* | 3/2006 | Brookshire | F02B 37/001 123/568.12 |
| 7,207,311 B2 | 4/2007 | Chmela et al. | |
| 7,591,131 B2 | 9/2009 | Easley, Jr. et al. | |
| 7,757,678 B2 | 7/2010 | Marsh et al. | |
| 8,015,809 B2 | 9/2011 | Watson | |
| 8,584,458 B2* | 11/2013 | Teng et al. | 60/605.2 |
| 8,793,996 B2* | 8/2014 | French | 60/605.2 |
| 2004/0206342 A1* | 10/2004 | Moyer | F02M 25/0728 123/568.12 |
| 2007/0193270 A1* | 8/2007 | Roozenboom et al. | 60/612 |
| 2008/0087238 A1* | 4/2008 | Held et al. | 123/41.48 |
| 2009/0000297 A1* | 1/2009 | Joergl | F02B 37/00 60/605.3 |

* cited by examiner

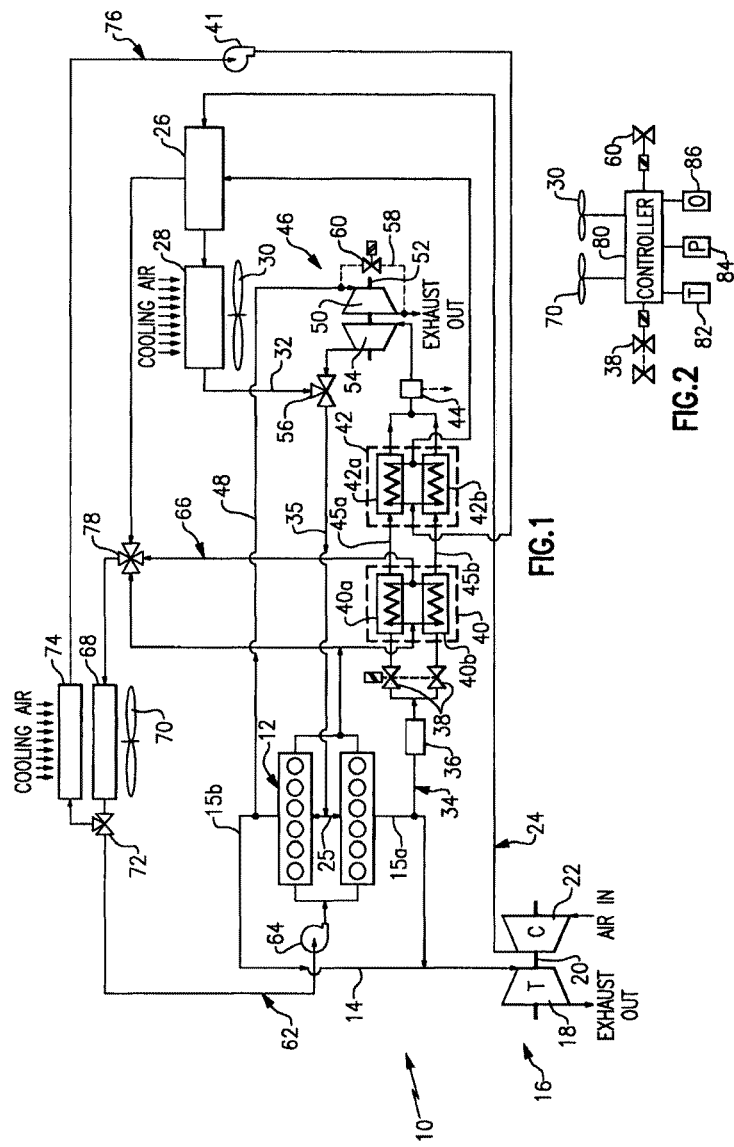

EXHAUST POWER TURBINE DRIVEN EGR PUMP FOR DIESEL ENGINES

CROSS-REFERENCE TO RELATED APPLICATIONS

This application is a divisional of U.S. patent application Ser. No. 12/785,095, filed on May 21, 2010. This application claims the benefit of U.S. Provisional Application No. 61/180,493, filed on May 22, 2009. The entire disclosures of each of the above applications are incorporated herein by reference.

FIELD

The present disclosure relates to turbo diesel engines having exhaust gas recirculation.

BACKGROUND

This section provides background information related to the present disclosure which is not necessarily prior art.

Large diesel engines are used in locomotive and off-road applications. Diesel engines for these applications are in the range of 3-5 megawatts, for example. It is desirable to recirculate the exhaust gases into the charge air stream to reduce the emissions of the diesel engine.

The intake pressure of large diesel engines is typically higher than the exhaust pressure. As a result, the exhaust gases must be pumped into the charge air to recirculate the exhaust gases. Electric motors are typically used as the exhaust gas recirculation pump. Electric motors can be difficult to package and may result in a fuel consumption penalty for the overall efficiency of the diesel engine.

SUMMARY

This section provides a general summary of the disclosure, and is not a comprehensive disclosure of its full scope or all of its features.

A power plant is provided and may include an engine configured to receive charge air and produce exhaust. A first turbo machine may be driven by the exhaust and may drive a compressor that receives air and produces the charge air. A second turbo machine may receive the exhaust and may rotationally drive a pump in response thereto. The pump may receive an EGR from the exhaust and may introduce the pumped EGR to the charge air.

In another configuration, a power plant is provided and may include an exhaust gas recirculation passage and a pump arranged in the exhaust gas recirculation passage. A heat exchanger may be arranged in the exhaust gas recirculation passage upstream from the pump. An EGR catalyst may be arranged in the exhaust gas recirculation passage upstream from the heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of an example powertrain system using exhaust gas recirculation; and FIG. 2 is a schematic of an example control system for the powertrain system illustrated in FIG. 1.

Corresponding reference numerals indicate corresponding parts throughout the several views of the drawings.

DETAILED DESCRIPTION

Example embodiments will now be described more fully with reference to the accompanying drawings.

A power plant 10 includes an internal combustion diesel engine 12, which produces exhaust that is expelled through an exhaust passage 14. The exhaust passage 14 includes one or more exhaust manifolds 15a, 15b. Two exhaust manifolds 15a, 15b are shown in the example, which may be provided on opposing banks of a V-configured engine, for example. Other engine configurations may be used.

A first turbo machine 16, which includes a first turbine 18 and a compressor 22 coupled to a common shaft 20, is arranged in the exhaust passage 14, and, in particular, in the first manifold 15a. The first turbine 18 is rotationally driven by the expanding exhaust gases. The first turbine 18 may have a fixed geometry, variable geometry and/or a wastegate. The compressor 22 receives atmospheric air and is rotationally driven by the first turbine 18 to provide compressed air or charge air via a charge air passage 24 to an intake manifold 25 associated with the engine 12.

The charge air is provided from the first turbo machine 16 to a heat exchanger 26, which is a liquid-to-air configuration in the example, and then a cooler 28, which is an air-to-air configuration in the example. A fan 30 draws air through the cooler 28 before providing the cooled charge air 32 to an intake manifold of the engine 12. This significantly reduces the cooling load for the cooler 28 and allows better control of the temperature at the intake manifold 25 by regulating the speed of the fan 30. In one example, a controller 80 (FIG. 2) is programmed to selectively energize the fan 30 in response to temperature 82, pressure 84, and/or other 86 conditions to obtain a desired cooled charge air temperature, for example.

Returning to FIG. 1, exhaust gas recirculation air (EGR) is diverted from the exhaust passage 14 through an EGR passage 34 for introduction into the charge air passage 24 to reduce the overall emissions of the engine 12. The EGR flows through an EGR catalytic converter 36 before entering flow regulating valves 38 which controls the required EGR flow rate according to the engine operation (loads and speeds, for example). The EGR is typically initially at approximately at 500-600° C. The EGR enters a high temperature EGR cooler 40 where the temperature of the EGR is reduced to approximately 350° C.

The cooled EGR exiting the high temperature EGR cooler 40 flows serially into a low temperature EGR cooler 42 where the EGR is further cooled to approximately 60° C. The high and low temperature EGR coolers 40, 42 are liquid-to-gas heat exchangers in the example. Due to the significant reduction of temperature of the EGR no heat exchanger after the pump 54 is needed and, a water separator 44 is provided to remove the condensates from the EGR before introducing the EGR into the charge air flow passage 24. The EGR catalytic converter 36 and water separator 44 prevent hydrocarbon fouling that might occur upon introducing the EGR to the charge air.

The cooled EGR is received by a second turbo machine 46, which includes a second turbine 50 and a pump 54 coupled to a common shaft 52. A portion of exhaust gas 48 from the second exhaust manifold 15b is used to rotationally drive the second turbine 50 and the pump 54. Significantly reducing the temperature of the EGR entering the pump 54 using the high and low temperature EGR coolers 40, 42 reduces the power requirement of the second turbo machine 46 needed to drive the pump 54.

The amount of exhaust gas that is received by the second turbine 50 is regulated by a bypass passage 58 and bypass valve 60, which functions as an external waste gate, arranged within the bypass passage 58. The controller 80 (FIG. 2) is in communication with the bypass valve 60 and is programmed to control exhaust gas 48 through the second turbine 50 according to the flow rate of EGR and the pressure of the cooled charge air 32 whose pressure is approximately equal to the outlet pressure of the pump 54. The pumped EGR is provided to a mixer 56 where the EGR is introduced into the cooled charge air to provide diluted charge air 35.

The engine 12 includes a liquid cooling loop 62 that is circulated by a water pump 64. The coolant exits the engine 12 at approximately 90° C. before entering a high temperature cooling loop or circuit 66. The coolant from the engine 12 is provided to the high temperature EGR cooler 40 before being returned to a high temperature radiator 68. The coolant exits the high temperature EGR cooler 40 at approximately 100° C.

A portion of the coolant is diverted from the coolant loop 62 by a valve 72 to a low temperature coolant loop or circuit 76. The diverted coolant flows through a low temperature radiator 74 and its pressure is boosted by a water pump 41 before being sent to the low temperature EGR cooler 42. A fan 70 draws cooling air from the atmosphere through the low and high temperature radiators 74, 68. In one example, a controller 80 (FIG. 2) is programmed to selectively energize the fan 70 in response to temperature 82, pressure 84, and/or other 86 conditions to obtain a desired coolant temperature in one or both of the high and low temperature coolant circuits 66, 76, for example.

Returning to FIG. 1, the low temperature coolant loop 76 provides coolant at around 40° C. to the low temperature EGR cooler 42 where it exits the low temperature EGR cooler at approximately 50° C. before flowing through the heat exchanger 26. The low temperature coolant is returned to the engine coolant loop 62 through a mixer 78. In the example, the low temperature coolant is reintroduced to the engine coolant loop 62 before entering the high temperature radiator 68.

In the example, the high temperature EGR cooler 40 includes first and second EGR heat exchangers 40a, 40b that are arranged parallel to one another. The low temperature EGR heat exchanger 42 includes first and second low temperature EGR heat exchangers 42a, 42b arranged parallel to one another. The first high and low temperature EGR heat exchangers 40a, 42a are arranged in series with one another to provide a first EGR flow path 45a. The second high and low temperature EGR heat exchangers 40b, 42b are arranged in series with one another to provide a second EGR flow path 45b. The first and second EGR flow paths 45a, 45b converge before the pump 54. During low EGR flow conditions, one of the first and second EGR flow paths 45a, 45b can be shut off by the flow regulating valves 38.

Although an example embodiment has been disclosed, a worker of ordinary skill in this art would recognize that certain modifications would come within the scope of the claims. For that reason, the following claims should be studied to determine their true scope and content.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power plant comprising:
an engine configured to receive charge air and produce exhaust;
a first turbo machine including a first turbine and a compressor, the first turbine being configured to be driven by the exhaust and drive the compressor that receives air, the compressor being configured to produce the charge air;
a second turbo machine including a second turbine and a pump, the second turbine being configured to receive the exhaust in parallel with the first turbine and rotationally drive the pump in response thereto, the pump being configured to:
receive the exhaust from a location upstream of the first turbo machine; and
introduce the pumped exhaust to the charge air;
a bypass passage in fluid communication with an inlet and an outlet of the second turbine and thereby allowing the exhaust to bypass the second turbine; and
a bypass valve arranged in the bypass passage.

2. The power plant according to claim 1, wherein the engine has an intake manifold, a charge air passage in fluid communication with the intake manifold and configured to supply the charge air to the engine, an exhaust passage in fluid communication with the engine and configured to receive the exhaust, and an exhaust gas recirculation (EGR) passage in fluid communication with the exhaust passage and the charge air passage, and configured to receive the exhaust.

3. The power plant according to claim 2, wherein the first turbine is arranged in the exhaust passage and is configured to be driven by the exhaust and rotationally drive the compressor, the compressor configured to compress the air and produce the charge air.

4. The power plant according to claim 2, wherein the second turbine is arranged in the exhaust passage and is configured to be driven by the exhaust and rotationally drive the pump, the pump arranged in the EGR passage receiving the exhaust from the exhaust passage and introducing the pumped exhaust to the charge air.

5. The power plant according to claim 2, wherein the exhaust passage includes a first exhaust manifold and a second exhaust manifold, the first and second turbines respectively arranged in the first and second exhaust manifolds.

6. The power plant according to claim 2, further comprising a controller in communication with the bypass valve and programmed to control the bypass valve to regulate the amount of the exhaust recirculated to the intake manifold.

7. The power plant according to claim 2, wherein the pump is disposed in the EGR passage.

8. The power plant according to claim 7, further comprising an EGR heat exchanger disposed in the EGR passage upstream from the pump, and a liquid cooling loop in fluid communication with the engine and the EGR heat exchanger, the liquid cooling loop configured to cool the exhaust.

9. The power plant according to claim 8, wherein the EGR heat exchanger includes a high temperature EGR heat exchanger and a low temperature EGR heat exchanger arranged serially relative to one another, and the liquid cooling loop includes a high temperature cooling circuit and a low temperature cooling circuit respectively including the high temperature EGR heat exchanger and the low temperature EGR heat exchanger.

10. A power plant comprising:
an engine having an intake manifold and an exhaust manifold;
an exhaust gas recirculation (EGR) passage that is directly connected to the exhaust manifold and fluidly connecting the exhaust manifold and the intake manifold;
a first turbo machine including a first turbine and a compressor, the first turbine being configured to receive exhaust from the exhaust manifold and to drive the compressor, the compressor being configured to provide compressed gas to the intake manifold;
a second turbo machine including a second turbine and a pump, the second turbine being configured to receive exhaust from the exhaust manifold in parallel with the first turbine and to drive the pump, the pump being arranged in the EGR passage and configured to send pumped exhaust to the intake manifold;
a bypass passage in fluid communication with an inlet and an outlet of the second turbine and thereby allowing the exhaust to bypass the second turbine; and
a bypass valve arranged in the bypass passage;
a heat exchanger arranged in the EGR passage upstream from the pump; and
an EGR catalyst arranged in the EGR passage upstream from the heat exchanger.

11. The power plant according to claim 10, wherein the heat exchanger includes a high temperature EGR heat exchanger and a low temperature EGR heat exchanger arranged in the EGR passage serially relative to one another upstream from the pump.

12. The power plant according to claim 11, wherein the low temperature EGR heat exchanger is arranged between the high temperature EGR heat exchanger and the pump.

13. The power plant according to claim 11, wherein the high temperature EGR heat exchanger is arranged between the low temperature EGR heat exchanger and the EGR catalyst.

14. The power plant according to claim 11, wherein the high temperature EGR heat exchanger includes a pair of heat exchangers.

15. The power plant according to claim 14, wherein the low temperature EGR heat exchanger includes a pair of heat exchangers.

16. The power plant according to claim 15, further comprising a high temperature cooling loop and a low temperature cooling loop respectively providing coolant to the high and low temperature EGR heat exchangers.

17. The power plant according to claim 16, further comprising a controller operable to obtain a desired coolant temperature in at least one of the low temperature cooling loop and the high temperature cooling loop.

18. The power plant according to claim 10, further comprising a water separator arranged in the EGR passage between the heat exchanger and the pump.

19. The power plant according to claim 10, wherein no heat exchanger is arranged in the EGR passage downstream from the pump.

20. The power plant according to claim 10, wherein the engine configured to expel exhaust to an exhaust passage, and the heat exchanger is arranged in the EGR passage upstream from the pump and downstream from a location where the exhaust passage splits to provide exhaust gas to the first and second turbo machines in parallel.

21. An engine system comprising:
an engine configured to receive intake air from an intake air passage and to expel exhaust to an exhaust passage;
a first turbo machine including a first turbine and a compressor, the first turbine being configured to receive exhaust and to drive the compressor, the compressor being configured to provide compressed gas to the engine; and
an exhaust gas recirculation (EGR) passage configured to receive exhaust from the exhaust passage at a location upstream of the first turbo machine and to recirculate exhaust through the engine;
a second turbo machine including a second turbine and a pump, the second turbine being configured to receive exhaust in parallel with the first turbine and to drive the pump, the pump being configured to receive exhaust from the EGR passage and to introduce pumped exhaust to the intake air passage;
a bypass passage in fluid communication with an inlet and an outlet of the second turbine and thereby allowing exhaust to bypass the second turbine; and
a bypass valve arranged in the bypass passage.

22. The engine system according to claim 21, wherein the EGR passage extends from an exhaust manifold of the engine to the intake air passage.

23. The engine system according to claim 21, wherein the compressor is configured to compress intake air in the intake air passage to produce the compressed gas.

* * * * *